(12) United States Patent
Han et al.

(10) Patent No.: US 8,815,759 B2
(45) Date of Patent: Aug. 26, 2014

(54) CEMENT-FREE HIGH STRENGTH UNSHAPED REFRACTORY

(71) Applicant: Korea Institute of Science and Technology, Seoul (KR)

(72) Inventors: Kyoung Ran Han, Seoul (KR); Sang Whan Park, Seoul (KR); Chang Sam Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/674,336

(22) Filed: Nov. 12, 2012

(65) Prior Publication Data
US 2013/0260982 A1 Oct. 3, 2013

(30) Foreign Application Priority Data
Mar. 30, 2012 (KR) ........................ 10-2012-0033223

(51) Int. Cl.
*C04B 35/103* (2006.01)
*C04B 35/567* (2006.01)

(52) U.S. Cl.
USPC ........................................... 501/89; 501/125

(58) Field of Classification Search
USPC ................................................... 501/89, 125
See application file for complete search history.

(56) References Cited

U.S. PATENT DOCUMENTS

| 3,892,584 A | * | 7/1975 | Takeda et al. | 501/89 |
| 4,069,057 A | * | 1/1978 | Kamei et al. | 501/87 |
| 2013/0260981 A1 | * | 10/2013 | Kim et al. | 501/89 |

FOREIGN PATENT DOCUMENTS

| JP | 09-183674 A | | 7/1997 |
| JP | 2004-168580 A | | 6/2004 |
| KR | 1020110104713 A | | 9/2011 |
| KR | 10-1095027 B1 | | 12/2011 |
| WO | 2011115352 | * | 9/2011 |

* cited by examiner

*Primary Examiner* — Karl Group
(74) *Attorney, Agent, or Firm* — Ladas & Parry LLP

(57) ABSTRACT

Disclosed is a cement-free high strength unshaped refractory in which barium aluminate and a dispersant are further added to a refractory which includes a refractory material containing $Al_2O_3$ and SiC and an alumina sol binder to largely improve handling strength of the unshaped refractory. The unshaped refractory according to the present invention is usefully applicable to lining which contacts slag in a blast furnace or a gasifier.

7 Claims, 1 Drawing Sheet

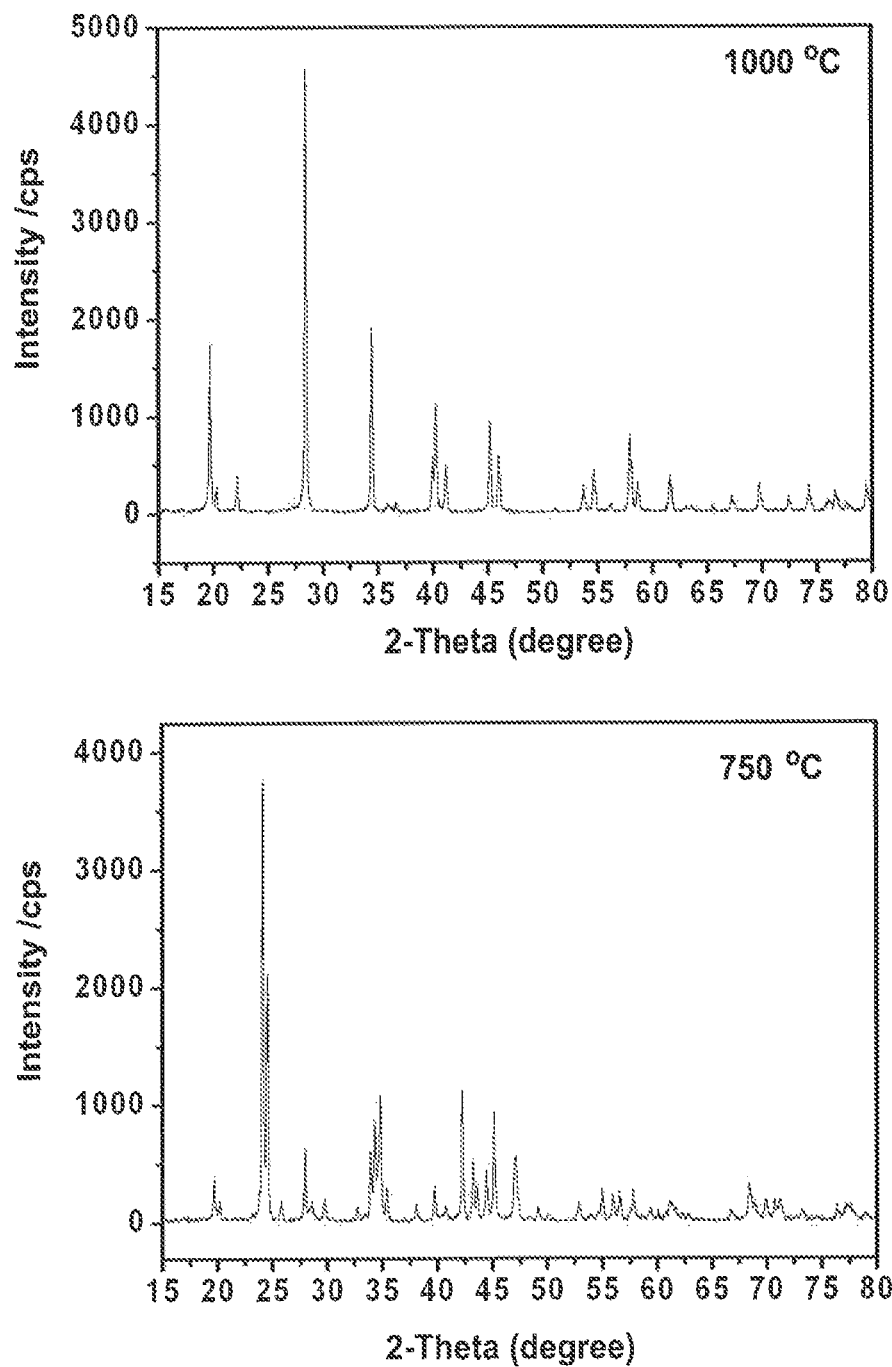

CEMENT-FREE HIGH STRENGTH UNSHAPED REFRACTORY

CROSS-REFERENCE TO RELATED APPLICATION

This application claims under 35 U.S.C. §119(a) the benefit of Korean Patent Application No. 10-2012-0033223 filed on Mar. 30, 2012, the entire contents of which are incorporated herein by reference.

BACKGROUND (a) Technical Field

The present invention relates to a cement-free high strength unshaped refractory, in which barium aluminate and a dispersant are further added to a refractory which includes a refractory material containing $Al_2O_3$ and SiC and an alumina sol binder to largely improve handling molding strength of the unshaped refractory. The unshaped refractory according to the present invention is usefully applicable to a lining which contacts slag in a blast furnace or a gasifier.

(b) Background Art

Unshaped refractories are in general preferred over refractory bricks due to the gaps present between refractory bricks. However, unshaped refractories have disadvantages that they require a longer lifespan, variety in material selection, and improvement in construction methods.

The unshaped refractories generally consist of refractory materials composed of oxides, carbides, or mixtures thereof, and a binder for binding the refractory materials. As the binder included in the refractory, a calcium aluminate cement binder is mainly used, but the cement binder has a long dry time due to slow water evaporation. In addition, the cemented binder, due to the presence of calcium oxide (CaO), lowers the viscosity of slag by reacting with it at high temperature, thus readily facilitating permeation into the refractory and accelerating their erosion. Consequently, as an inorganic binder to be included in the refractory, a low-calcium aluminate cement with low calcium content is preferred.

Recently, a phosphate unshaped refractory has been suggested to replace the cement binder. The phosphate unshaped refractory uses mono-aluminum phosphate as a binder, and uses magnesium oxide (MgO) as a hardener. Although the phosphate unshaped refractory is applicable in a combustion furnace, it is not suitable for a gasifier with insufficient oxygen. Moreover, in a $P_2O_5$—MgO-based unshaped refractory, a compound with low melting point is generated, and mono-aluminum phosphate, which is water-soluble, moves to the surface, resulting in non-uniform strength. Under high temperature reduction atmosphere, $P_2O_5$ is volatilized so that the strength can be lowered or become non-uniform. Therefore, the phosphate unshaped refractory is not suitable for forming a refractory structure.

Recently, an unshaped refractory using a hydratable alumina binder has been introduced. The hydratable alumina mainly includes α-alumina powder, and also includes ρ-alumina which readily reacts with water, and a small amount of CaO and $SiO_2$. Examples of currently commercialized hydratable alumina binders may include AlphaBond 300 and 500 of Almatis Alcoa Industrial Chemicals Division. Alphabond 300 has the average particle size of 2.3 μm, and CaO content of less than 0.1 wt %. Alphabond 500 has the average particle size of 5.2 μm, and CaO content of 0.6 wt %. Alphabonds are recommended for use in no-cement castables, with binder content in the range of 3-7 wt %. However, a refractory using a hydratable alumina binder has a low strength (1.2-2.0 MPa) at a temperature from 800 to 1200° C., where dehydration occurs but no binding between refractories occurs.

In addition, Japanese Patent Application Publication No. 2004-168580 discloses a SiC-containing unshaped refractory used for lining of a blast furnace by including an alumina cement binder in a refractory containing $Al_2O_3$ and SiC. That is, the unshaped refractory is manufactured using SiC fine powder (<5 μm), alumina (<1 μm), silica (<1 μm) and a small amount of alumina cement (1.5%), and an SiC content of less than 5 μm is 3-10 wt %, and improvements are obtained in terms of fluidity, erosion resistance, and abrasion resistance.

In addition, the present inventors have already disclosed an unshaped refractory including refractory materials; which contains $Al_2O_3$ and SiC, and an alumina sol binder in Korean Patent Application Publication No. 10-2011-0104713. The use of alumina sol binder facilitates easy contact between the refractory materials due to fluidity of the sol, thus improving the binding property. Moreover, since the cement binder is not used, the problem associated with the use of cement is solved, and a thin film is formed with gelation of the alumina sol thereby enabling a quick dry and generation of no crack during the dry process.

However, when compared to a refractory using a conventional cement binder or phosphate-based binder, like a hydratable alumina binder the disclosed unshaped refractory has low green strength(okay), and therefore, there is a need for the development of a technique for improving handling strength.

SUMMARY OF THE DISCLOSURE

Accordingly, the present invention has been made to solve the foregoing problem, and provides a new unshaped refractory which does not use a cement or phosphate-based binder, and largely improves handling strength merely using an alumina binder.

That is, in the present invention, a barium aluminate inorganic additive is selectively included in an alumina sol binder to give operation fluidity and largely improve green and sintered strengths.

According to an aspect of the present invention, there is provided a cement-free high strength unshaped refractory including a refractory mixture containing $Al_2O_3$ and SiC, alumina sol, barium aluminate, and a dispersant.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein:

FIG. shows an XRD pattern of barium aluminate powders obtained after a powder synthesized using alumina and barium carbonate as main materials according to a solid-phase method is thermally treated for 2 hours at 1000° C. and 750° C., respectively.

DETAILED DESCRIPTION

Hereinafter, the present invention will be described in detail with reference to the accompanying drawings to allow those of ordinary skill in the art to easily carry out the present invention.

The present invention relates to a cement-free high strength unshaped refractory, and more particularly, to a cement-free high strength unshaped refractory which includes an alumina sol binder, barium aluminate, and a dispersant as essential components in a refractory material containing $Al_2O_3$ and SiC.

The respective components of the unshaped refractory according to the present invention will be described below in more details.

In the present invention, a mixture of $Al_2O_3$ and SiC is used for the refractory material. In the present invention, a mixing ratio of the refractory mixture is not specially limited, and nevertheless, if forced to be limited, a mixing ratio of $Al_2O_3$:SiC is 10:90-90:10 wt %.

$Al_2O_3$ is one of aggregate components which form a structure of the refractory, and a fine powder of alumina is used for binding in sintering and is effective to maintain high strength in manufacturing of the refractory. The particle size of $Al_2O_3$ may be selected in a range of 0.1-6000 μm, and in the present invention, the particle size and particle mixing ratio of $Al_2O_3$ are not specifically limited.

SiC is one of aggregate components which form a structure of the refractory, and is insoluble in water or acid, has superior heat conduction, is chemically inactive, and is very hard, such that when used in a slag contact portion in a blast furnace, SiC prevents erosion and abrasion from occurring when the melted slag flows along the wall of the refractory, and thus is very useful for maintaining durability. SiC may be classified into fine powders (particle size of 50 μm or less), fine grains (particle size of 50 μm-1 mm) and aggregates (1 mm-10 mm) according to a particle size and in the present invention, the particle size and particle mixing ratio of SiC are not specifically limited.

In the present invention, the refractory material may further include one kind or more selected from a group consisting of magnesium oxide, spinel, zirconia, chromia, hafnium oxide, and so forth in addition to the mixture of $Al_2O_3$ and SiC in a range of 2-40 wt % with respect to a total weight of the refractory mixture.

In the present invention, alumina sol is used for the binder. The alumina sol binder gives operation fluidity to the refractory mixture, and does not undergo erosion caused by CaO even when used at high temperature, because of not using CaO-containing cement. Moreover, the alumina sol binder maintains a shape after drying, and is hardly contracted after high-temperature sintering, showing high strength. In addition, unlike a cement binder, the alumina sol binder is dehydrated during gelation, thus being quickly dried, and merely with a small amount of alumina sol, alumina gel forms a thin film, such that no crack is generated in drying.

The alumina sol is manufactured at the concentration of 10 wt % by hydrolysis and polymerization of a boehmite slurry using acid. The acid may be selected from a group consisting of nitric acid, hydrochloric acid, acetic acid, formic acid, phosphoric acid, sulfuric acid, etc.

The content of alumina sol contained as a binder in the unshaped refractory may be 0.1-10 parts by weight, preferably 0.2-4 parts by weight, and more preferably 0.3-1.5 parts by weight, relative to 100 parts by weight of the refractory mixture based on a content of alumina. If the content of the alumina sol binder is too small with respect to the refractory mixture, then the alumina sol binder cannot serve as the binder; if the content of the alumina sol binder is excessively large, problems may occur in erosion resistance and heat conduction.

The unshaped refractory according to the present invention may further include, in addition to the inorganic binder of alumina sol, an organic binder such as methyl cellulose, hydroxymethyl cellulose, hydroxyethyl cellulose (HEC), hydroxypropyl cellulose, latex, or the like. In an embodiment of the present invention, a detailed example of using hydroxyethyl cellulose (HEC) is disclosed, but the present invention is not limited thereto. A content of the organic binder may be 0.03-1.0 parts by weights, preferably 0.05-0.5 parts by weight, relative to 100 parts by weight of the refractory mixture. The organic binder suppresses flow of the refractory which may occur during drying and improves the green strength, but the organic binder decomposed during thermal treatment makes pores and thus may be unfavorable to strength and heat conduction, and therefore, the organic binder is used preferably as in a small amount as possible.

The unshaped refractory according to the present invention includes barium aluminate as an additive. By including barium aluminate in the refractory, the green strength, such as compressive strength, bending strength, etc., of the unshaped refractory, is largely improved, and the sintered material is also improved in its strength and sintered density.

Barium aluminate is a result of synthesis, using alumina and barium carbonate as main materials according to a solid state reaction, and through heat treatment in the air for 1-5 hours at 800-1500° C., barium aluminate having a single phase is manufactured. Shown in FIG. are the results of X-ray diffraction analysis with respect to powders obtained after heat treatment for 2 hours at heat treatment temperatures of 1000° C. and 750° C., respectively. It can be seen from FIG. that in case of heat treatment for 2 hours at 1000° C., a barium aluminate single phase is made. On the other hand, a powder obtained by heat treatment for 2 hours at 750° C. is a barium aluminate precursor in which an XRD pattern of barium carbonate is a main pattern. The unshaped refractory according to the present invention may use both of the obtained powders as additives, because the barium aluminate precursor is also transformed into crystalline barium aluminate during high temperature sintering.

The content of barium aluminate included as an additive in the unshaped refractory according to the present invention may be 0.1-10 parts by weight, preferably 1-5 parts by weight, relative to 100 parts by weight of the refractory mixture. If the content of the barium aluminate is too small with respect to the refractory mixture, the green strength cannot be improved; if the content of the barium aluminate is excessively large, hardening is fast and thus an operating time is shortened, making it difficult to obtain uniform mixing.

To evenly disperse components of the unshaped refractory in the present invention, a dispersant may be used. The dispersant may be selected from a group consisting of a polycarboxylate ether-based dispersant, a polyacryl-based dispersant, etc. The content of the dispersant may be 0.02-1 part by weight, preferably 0.05-0.5 part by weight, relative to 100 parts by weight of the refractory mixture.

The foregoing respective components manufacture a molded product of the unshaped refractory. The molded product is dried for 2-6 hours at room temperature (specifically, 5-30° C.) and then 3-7 hours at 60-150° C. again. Thereafter, the product is thermally treated for 2-5 hours at 600-1500° C., thus manufacturing a sintered product.

The present invention described above will be described in more details with reference to the following Examples, but the present invention is not limited to the Examples.

EXAMPLE

Manufacturing Example 1

Preparation of Refractory Mixture

The compositions of a refractory of $Al_2O_3$ and SiC used in an embodiment of the present invention are shown in Table 1.

TABLE 1

| Component | Average particle size | Composition (wt %) | | | |
|---|---|---|---|---|---|
| | | M | M-1 | M-2 | M-3 |
| $Al_2O_3$ | 750 μm | 0 | 20 | 20 | 5 |
| | 40 μm | 0 | 0 | 0 | 15 |
| | 3 μm | 0 | 3 | 3 | 3 |
| | 0.5 μm | 4 | 7 | 7 | 7 |
| SiC | 1.25 mm | 40 | 25 | 45 | 40 |
| | 750 μm | 20 | 20 | 0 | 20 |
| | 90 μm | 10 | 3 | 3 | 3 |
| | 20 μm | 20 | 20 | 20 | 5 |
| | 5 μm | 6 | 2 | 2 | 2 |
| Content | | 100 | 100 | 100 | 100 |

Examples 1 and 2 and Comparative Examples 1 and 2

According to compositions shown in Table 2 provided below, a refractory mixture M-2, a single-phase barium aluminate (1000° C.-calcined powder), hydroxyethyl cellulose (HEC) as an organic binder, and a polycarboxylate ether (VP 65, BASF Co. Ltd., Germany) dispersant were put and mixed together, and alumina sol (concentration of 10 wt % as boehmite) was added to the mixture little by little to be sufficiently mixed with the mixture, thus forming an unshaped slurry. The unshaped slurry was molded into a bar of a size of ~15×15×40 mm³. The molded product was dried at room temperature, and is further dried for 3 hours or more in a 100° C. oven and then cooled to room temperature, such that a refractory specimen for testing handling strength was manufactured.

The compressive strength of the manufactured refractory specimen was measured at a cross head speed of 1 mm/min by using the Instron instrument. The results are shown in Table 2.

TABLE 2

| | Refractory Composition (parts by weight) | | | | | Compressive Strength (MPa) |
|---|---|---|---|---|---|---|
| | Refractory (M-2) | $BaAl_2O_4$ | HEC | VP 65 | Alumina sol (10 wt %) | |
| Ex. 1 | 100 | 2 | 0 | 0.3 | 7 | 18 |
| Ex. 2 | 100 | 2 | 0 | 0.5 | 8 | 20 |
| Comp. Ex 1 | 100 | 0 | 0 | 0 | 8 | 1.7 |
| Comp. Ex 2 | 100 | 0 | 0.05 | 0 | 8 | 2.5 |

According to the results shown in Table 2, refractory specimens of Examples 1 and 2 to which barium aluminate was added have sufficiently high compressive strengths, but refractory specimens of Comparative Examples 1 and 2 to which barium aluminate was not added have very low compressive strengths of 2.5 MPa or less.

Examples 3-5

According to compositions shown in Table 3 provided below, a refractory mixture M-1, a single-phase barium aluminate (1000° C.-calcined-powder), hydroxyethyl cellulose (HEC) as an organic binder, and a polycarboxylate ether (VP 65, BASF Co. Ltd., Germany) dispersant were put and mixed together, and the alumina sol was added to the mixture little by little to be sufficiently mixed with the mixture, thus forming an unshaped slurry. The unshaped slurry was molded into a bar of a size of ~15×15×40 mm³. The molded product was dried at room temperature, and is further dried for 3 hours or more in a 100° C. oven and then cooled to room temperature, such that Refractory Specimen 1 for checking handling strength was manufactured. The molded product was heated to 800° C. at a speed of 3° C./min and maintained for 3 hours, and then cooled to room temperature at 3° C./min, thus manufacturing Refractory Specimen 2.

The compressive strengths of the refractory specimens manufactured above were measured at a cross head speed of 1 mm/min using the Instron instrument. The results are shown in Table 3.

TABLE 3

| | Refractory Composition (parts by weight) | | | | | Compressive Strength (MPa) | |
|---|---|---|---|---|---|---|---|
| | Refractory (M-1) | $BaAl_2O_4$ | HEC | VP 65 | Alumina sol (10 wt %) | Specimen 1 (100° C.) | Specimen 2 (800° C.) |
| Ex. 3 | 100 | 2 | 0 | 0.3 | 8 | 23.4 | 18.8 |
| Ex. 4 | 100 | 3 | 0 | 0.3 | 9 | 23.9 | 25.1 |
| Ex. 5 | 100 | 5 | 0 | 0.3 | 9 | 17.4 | 25.6 |

According to the results shown in Table 3, as the content of barium aluminate increases, the compressive strength tends to increase, but when the content thereof exceeds a particular level, the effect of addition thereof cannot be further expected, such that economic efficiency is degraded. Moreover, the sintered product obtained by thermally treating the refractory at 800° C. also has excellent compressive strength.

Examples 6-8

With a refractory mixture M-3 according to compositions of Table 4 by using methods described in Examples 3-5, Refractory Specimen 1 and Refractory Specimen 2 were manufactured to measure compressive strengths, and the results are shown in Table 4.

TABLE 4

| | Refractory Composition (parts by weight) | | | | Compressive Strength (MPa) | |
|---|---|---|---|---|---|---|
| | Refractory (M-3) | BaAl$_2$O$_4$ | HEC | VP 65 | Alumina sol (10 wt %) | Specimen 1 (100° C.) | Specimen 2 (800° C.) |
| Ex. 6 | 100 | 2 | 0 | 0.5 | 9 | N.A | 15.8 |
| Ex. 7 | 100 | 2 | 0 | 0.3 | 9 | 15.1 | 18.5 |
| Ex. 8 | 100 | 2 | 0.05 | 0.3 | 8 | 14.7 | 16.3 |

According to the results shown in Table 4, when barium aluminate, a dispersant, and an alumina sol binder are used together, superior handling strength can be obtained, and addition of an organic binder (HEC) does not have a significant influence. The refractory obtained by thermally treating the molded product at 800° C. also has excellent compressive strength.

Examples 9-11

With a refractory mixture M according to compositions of Table 5 by using methods described in Examples 1 and 2, a refractory specimen was manufactured to measure compressive strength, and the results are shown in Table 5.

TABLE 5

| | Refractory Composition (parts by weight) | | | | | Compressive Strength (MPa) |
|---|---|---|---|---|---|---|
| | Refractory (M) | BaAl$_2$O$_4$ | HEC | VP 65 | Alumina sol (10 wt %) | |
| Ex. 9 | 100 | 2 | 0 | 0.3 | 8.4 | 18.5 |
| Ex. 10 | 100 | 2 | 0 | 0.3 | 8.4 | 18.7 |
| Ex. 11 | 100 | 3 | 0 | 0.3 | 8.5 | 26.3 |

According to the results shown in Table 5, excellent handling strength can be obtained without the organic binder (HEC), and when the content of barium aluminate is increased to 3 parts by weight, the strength is also improved.

Examples 12-14 and Comparative Examples 3-5

With the refractory mixture M according to compositions of Table 6 by using methods described in Examples 3-5, Refractory Specimen 1 was manufactured. Specimen 2 was manufactured by further performing a thermal treatment process of increasing the temperature to 1350° C. at 5° C./min and held at that temperature for 3 hours, and then cooled to the room temperature at 5° C./min. The compressive strengths of the manufactured Specimen 1 and Specimen 2 were measured, and the results are shown in Table 6.

TABLE 6

| | Refractory Composition (parts by weight) | | | | Specimen 1 (100° C.) | Specimen 2 (1350° C.) | | |
|---|---|---|---|---|---|---|---|---|
| | Refractory (M) | BaAl$_2$O$_4$ | HEC | VP 65 | Alumina sol (10 wt %) | Bending Strength (MPa) | Bending Strength (MPa) | Density (g/cm$^3$) | Compressive Strength (MPa) |
| Ex. 12 | 100 | 1 | 0.05 | 0.3 | 7.5 | 8.6 | 52.7 | 2.64 | 183 |
| Ex. 13 | 100 | 2 | 0 | 0.3 | 7.5 | 8.7 | 46.5 | 2.68 | 200 |
| Ex. 14 | 100 | 1 | 0 | 0.5* | 7.8 | N.A. | 52.7 | 2.61 | 175 |
| Com. Ex. 3 | 100 | 0 | 0 | 0 | 7.5 | 1.2 | 26.4 | 2.52 | 75.3 |
| Com. Ex. 4 | 100 | 0 | 0.05 | 0 | 7.9 | 3.1 | 32.1 | 2.56 | 75.2 |
| Com. Ex. 5 | 100 | 0 | 0.05 | 0.3 | 7.5 | 4.0 | 40 | 2.60 | 117 |

*In place of VP 65 as a dispersant, acryl-based Darvan C is used.

According to the results shown in Table 6, it can be seen from the result of Comparative Examples 3-5 that by adding the organic binder (HEC) to the inorganic binder of alumina sol, bending strength is improved and through further addition of a dispersant, bending strength may be further improved. Such improvement is significantly different from Examples 12 and 13 in which barium aluminate is included as an essential component. In Examples 12-14, 1 part by weight of barium aluminate and 2 parts by weight of barium aluminate were added to the composition of Comparative Example 5, but bending strength is improved two times or more. The refractory sintered product according to the present invention has high density and strength.

Examples 15 and 16 and Comparative Examples 6 and 7

With the refractory mixture M according to compositions of Table 7 by using methods described in Examples 12-14 and Comparative Examples 3-5, Refractory Specimen 1 and Refractory Specimen 2 were manufactured to measure compressive strengths, and the results are shown in Table 7. For barium aluminate, a barium aluminate precursor powder obtained through thermal treatment for 2 hours at 750° C. was used.

TABLE 7

| | Refractory Composition (parts by weight) | | | | | Specimen 1 (100° C.) | Specimen 2 (1350° C.) | | |
|---|---|---|---|---|---|---|---|---|---|---|
| | Refractory (M) | BaAl$_2$O$_4$ | HEC | VP 65 | Alumina sol (10 wt %) | Water | Bending Strength (MPa) | Bending Strength (MPa) | Density (g/cm$^3$) | Compressive Strength (MPa) |
| Ex. 15 | 100 | 1 | — | 0.3 | 7.5 | 0 | 6.3 | 51.3 | 2.67 | 179 |
| Ex. 16 | 100 | 2 | 0.05 | 0.3 | 7.5 | 0 | N.A. | 38.8 | 2.67 | 199 |
| Com. Ex. 6 | 100 | 1 | — | 0.3 | 0 | 6.5 | 1.0 | 37.9 | 2.69 | 98 |
| Com. Ex. 7 | 100 | 2.4 | 0.05 | 0.24 | 0 | 6.5 | 2.2 | 36.1 | 2.65 | 106 |

According to the results shown in Table 7, the barium aluminate precursor powder is also significantly improved in terms of strength and density. Moreover, in the refractory including barium aluminate as an essential component, the refractories including the alumina sol binder (Examples 15 and 16) maintain higher strengths than the refractories (Comparative Examples 6 and 7) without the binder. That is, barium aluminate, when added to the refractory using alumina sol as a binder, has the maximum addition effect.

As is apparent from the foregoing description, the unshaped refractory according to the present invention remarkably improves handling strength such as compressive strength, bending strength, etc.

The sintered product obtained by thermally treating the unshaped refractory according to the present invention also has significant improvements in density and strength thereof.

What is claimed is:

1. A cement-free high-strength unshaped refractory comprising:
    a refractory mixture containing Al$_2$O$_3$ and SiC, and alumina sol;
    barium aluminate; and
    a polycarboxylate ether-based dispersant.

2. The cement-free high-strength unshaped refractory of claim 1, wherein the alumina sol is manufactured by performing acid hydrolysis and polymerization of a boehmite slurry.

3. The cement-free high strength unshaped refractory of claim 1 or 2, wherein the alumina sol is contained in the amount of 0.1-10 parts by weight relative to 100 parts by weight of the refractory, based on a content of alumina.

4. The cement-free high strength unshaped refractory of claim 1, wherein the barium aluminate is barium aluminate synthesized using barium carbonate and alumina as main components according to a solid state reaction, or a precursor of the barium aluminate.

5. The cement-free high strength unshaped refractory of claim 1 or 4, wherein the barium aluminate is contained in the amount of 0.1-10 parts by weight relative to 100 parts by weight of the refractory mixture.

6. The cement-free high strength unshaped refractory of claim 1, wherein the dispersant is contained in the amount of 0.02-1 part by weight relative to 100 parts by weight of the refractory mixture.

7. The cement-free high strength unshaped refractory of claim 1, wherein the refractory mixture comprises one kind or more selected from a group consisting of magnesium oxide, spinel, zirconia, chromia, and hafnium oxide.

\* \* \* \* \*